United States Patent [19]

Sechrist

[11] Patent Number: 4,872,969
[45] Date of Patent: Oct. 10, 1989

[54] METHOD FOR VALVELESS CONTROL OF PARTICLE TRANSPORT

[75] Inventor: Paul A. Sechrist, Arlington Heights, Ill.

[73] Assignee: UOP, Des Plaines, Ill.

[21] Appl. No.: 173,831

[22] Filed: Mar. 28, 1988

[51] Int. Cl.[4] .............................................. C10G 35/00
[52] U.S. Cl. .................................... 208/173; 208/176; 208/147; 141/67; 422/144
[58] Field of Search .......................... 422/144; 210/33; 141/67; 406/192; 208/143, 146, 152, 147, 165, 166, 173, 176

[56] References Cited

U.S. PATENT DOCUMENTS

| | | |
|---|---|---|
| 2,423,411 | 7/1947 | Simpson . |
| 2,531,365 | 11/1950 | Simpson et al. ..................... 208/173 |
| 2,801,966 | 8/1957 | Mertes et al. ........................ 208/173 |
| 2,851,401 | 9/1958 | Payne .................................. 208/173 |
| 2,851,402 | 9/1958 | Haddad ............................... 208/173 |
| 2,854,156 | 9/1958 | Payne .................................. 422/216 |
| 2,854,161 | 9/1958 | Payne .................................. 414/786 |
| 2,985,324 | 5/1961 | Balentine . |
| 3,067,131 | 12/1962 | Bergstrom .......................... 208/173 |
| 3,647,680 | 3/1972 | Greenwood et al. ................ 208/65 |
| 3,692,496 | 9/1972 | Greenwood et al. ............ 23/288 G |
| 4,576,712 | 3/1986 | Greenwood ........................ 208/138 |

Primary Examiner—Glenn Caldarola
Attorney, Agent, or Firm—Thomas K. McBride; John G. Tolomei

[57] ABSTRACT

A method and apparatus are provided for controlling the transfer of particles between zones of different pressure using particle collection and particle transfer conduits. The solids are moved from a low pressure zone to a high pressure zone by means of a valveless lock hopper system that vents all of the gas from the collection zones through the particle collection conduits. Venting gas from the collection zones through the transfer conduits prevents erosion of control valves and eliminates the need for filters which are prone to clogging. The venting of gas is accomplished by varying the size of the transfer conduits between zones. The invention is particularly applicable in the regeneration of catalyst used in hydrocarbon conversion processes such as catalytic reforming.

5 Claims, 2 Drawing Sheets

4,872,969

METHOD FOR VALVELESS CONTROL OF PARTICLE TRANSPORT

FIELD OF THE INVENTION

This invention relates to the arts of solid particle transport control. More particularly, it relates to the control of semi-continuous particle transport using gas flow. A specific use involves the transport of catalyst in a moving bed hydrocarbon conversion processes.

INFORMATION DISCLOSURE

U.S. Pat. No. 4,576,712 (Greenwood) discloses a method for the semi-continuous transfer of solid catalyst particles from an upper zone to lower zone through an intermediate zone called a lock hopper. The zones are vertically arranged and connected by catalyst transfer pipes. Catalyst flow through the transfer pipes is interrupted by increasing the gas flux through the transfer pipes. Pressure is increased or decreased in the intermediate zone by venting gas from the lower zone to the intermediate zone or from the intermediate zone to the upper zone.

U.S. Pat. No. 2,851,401 (Payne) deals with the transfer of solid particulate matter from one location to another through transfer pipes and controlling the transfer of particulate matter by varying a gas flow to the different locations.

U.S. Pat. No. 2,851,402 (Haddad) provides information on solids transfer utilizing teachings of the Payne patent ('401).

An important application of the present invention involves catalyst which is used in hydrocarbon conversion processes. U.S. Pat. Nos. 2,423,411 (Simpson); 2,531,365 (Simpson et al.); 2,854,156 (Payne); 2,854,161 (Payne); and 2,985,324 (Balentine) are exemplary of references where hydrocarbon process catalysts are transported and treated.

For additional information on catalyst reforming and regeneration of catalyst, U.S. Pat. Nos. 3,647,680 (Greenwood et al.) and 3,692,496 (Greenwood et al.) may be consulted.

BACKGROUND OF THE INVENTION

There are many chemical processes where it is necessary to bring into contact a gas and solid particulate matter, or solids, or particles. Frequently, chemical reactions as well as physical phenomena take place during such contact. In most cases, gas and solids must be in contact for a minimum time period, if the contact is for a shorter period the desired chemical or physical reaction will not take place or will be incomplete. In some cases there is a maximum contact time period, beyond which less than optimum or undesirable results will be obtained. It is highly desirable to conduct gas/solid contacting processes in a continuous or semicontinuous manner rather than as a batch operation.

A contacting zone is usually maintained at some positive pressure (above atmospheric) of the contacting gas. Particles must be introduced and withdrawn from the pressurized zone without losing contacting gas to the atmosphere. It is often necessary to maintain the internal pressure of the contacting zone at a particular level or within a certain range. Contacting zone pressure may be higher than that of the zone from which solids are provided to the contacting zone. Feeding solids into a zone against a high pressure poses numerous problems. When equipment, such as screw conveyors or star valves is used, contact between equipment and solids degrades the solids particles by breaking them into smaller particles and causes equipment wear. It is difficult to maintain effective sealing to prevent escape of gas from the contacting zone and equipment maintenance costs are high. These problems are magnified when solids or gas or both are at elevated temperatures. Pressure lock systems having catalyst control valves through which the solids pass have been used for feeding solids into a pressurized zone, but the valves are highly subject to wear and can promote attrition of the particulate material.

U.S. Pat. No. 2,851,401, cited above, discusses the problems involved in solids transfer and teaches a method of transferring solids without the use of particle control valves. Instead, the flow of particles is regulated by varying the upward gas velocity through particle transfer conduit that connect particle retention zones. Particle flow is stopped by increasing the gas flux until it holds up the particles in the conduit. U.S. Pat. No. 4,576,712 shows a specialized piping and valve system for controlling gas flow and pressures between particle retention zones.

Although these arrangements do eliminate valves that directly control particle transport, the valves that control gas flow are still eroded by fine particles that are entrained in the gas flowing out of the particle zone. Filters and traps have been used to catch the fine particles and prevent damage to the valves. However, the filters tend to become plugged and can interfere with particle transport by retarding or preventing degassing of the collection zones.

BRIEF DESCRIPTION OF THE INVENTION

This invention is a system for controlling the transfer of particles between particle collection zones that vents all gas flow exiting the collection zones through the particle transfer conduits. By venting all exit gas through the transfer conduits, gas entrained particulates cannot erode control valves or plug filters. It was discovered that the exit gas could be vented through the transfer conduits if transfer conduits between progressively higher collection zones were made increasingly larger.

Accordingly, it is an object of this invention to eliminate the cause of valve wear and filter plugging.

It is a further object of this invention to improve the reliability of systems for solid particle transport.

Thus, in its most basic aspect, this invention is a method for transferring solid particles from an upper collection zone into an intermediate collection zone while preventing the transfer of particles from the intermediate collection zone to the lower zone. Transfer of particles into the lower zone is prevented by passing a gas into the lower zone and out of the lower zone through a lower transfer conduit and upwardly into the intermediate zone at a rate sufficient to prevent downward particle flow through the conduit. All of the gas entering the intermediate zone from the lower conduit passes upwardly out of the intermediate zone through an upper transfer conduit and into an upper particle collection zone. The upper conduit has a substantially larger flow area than the lower conduit so that venting of the lower conduit gas through the upper conduit will not prevent particle flow down the upper conduit.

In a more specific embodiment, this invention is a method for the semi-continuous transfer of solid particles through an upper collection zone, an intermediate collection zone and a lower collection zone. In a first step of this method, particles are passed from the upper zone to the intermediate zone through an upper transfer conduit, a first gas stream is passed into the lower zone, the first gas stream passes from the lower zone to the intermediate zone through a lower transfer conduit, and the first gas stream passes from the intermediate zone to the upper zone through the upper conduit. The upper conduit has a larger flow area than the lower conduit so that in this first step the first gas has a flux rate that will prevent particle transfer down the lower conduit while permitting particle transfer down the upper conduit. The next step in the method stops particle transport down the upper transfer conduit by introducing a second gas stream into the intermediate zone and creating a sufficient gas flux rate through the upper conduit to prevent downward particle transport. In a final step, the intermediate zone is unloaded by interrupting the flow of said first gas stream so that particles pass from the intermediate zone to the lower zone through the lower transfer conduit.

In another embodiment, this invention is an apparatus for the semi-continuous transfer of solid particles. The apparatus comprises an upper collection zone, and intermediate collection zone located below the upper collection zone and a lower collection zone located below the intermediate collection zone. The upper, lower and intermediate zones have a gas outlet, a first gas inlet and a second gas inlet in respective communication therewith. An upper transfer conduit communicates the upper zone with intermediate zone and a lower transfer conduit communicates the intermediate collection zone with the lower collection zone. The lower transfer conduit has a substantially smaller diameter than the upper transfer conduit so that gas entering through the first inlet can pass up the lower conduit at a sufficient flux rate to prevent downward particle transport therein and be vented from the intermediate zone up the upper conduit without preventing downward particle transport therein.

Other objects, embodiments and details of this invention are provided in the following detailed description.

DETAILED DESCRIPTION OF THE INVENTION

Figure 1:
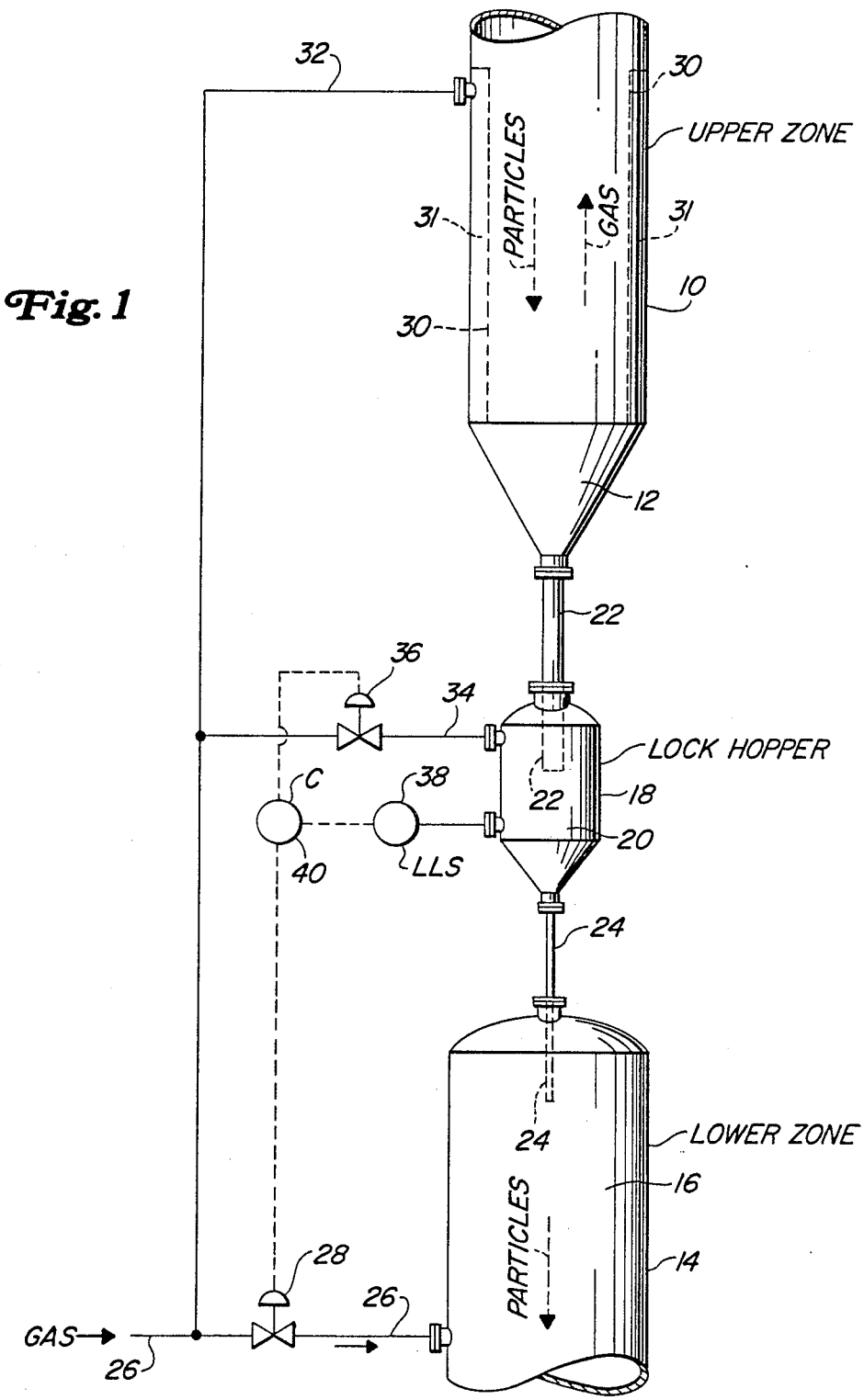
FIG. 1 is a schematic representation of an embodiment of the invention depicting an upper zone, an intermediate zone in the form of a lock hopper and a lower zone, where each zone is contained in a separate vessel.

The present invention is useful in the practice of a variety of processes and, in particular, in hydrocarbon conversion processes, such as catalytic reforming. Another process in which the invention may be utilized is the conversion of $C_3/C_4$ LPG to light olefins. This catalytic dehydrogenation process will convert, for example, propane to propylene. In another catalytic hydrocarbon conversion process, LPG is processed to yield aromatics and hydrogen. The present invention is useful in regenerating the catalyst used in these processes. An example of a process other than hydrocarbon conversion in which the present invention may be applied is the treatment of a gas stream to remove a component by means of contact with particulate solids, such as removal of sulfur dioxide from a flue gas stream upon passing the flue gas through a bed comprising a sulfur oxide acceptor such as copper-bearing alumina spheres. However, the preferred use of the invention is in hydrocarbon conversion processes and specifically in moving bed catalytic reforming.

The reforming of hydrocarbon feedstock, such as a naphtha fraction derived from petroleum, utilizing a platinum group metal-alumina catalyst, is a process well known in the art. Briefly, a naphtha feedstock is admixed with hydrogen and contacted with the catalyst in a reaction zone, at reforming conditions of temperature and pressure to cause at least a portion of the naphtha feedstock to be upgraded to products of improved octane value. After a period of time in use, the catalyst used in the process must be regenerated, that is, it must be treated to restore it to a satisfactory level of activity and stability for catalyzing the reforming reactions. Regeneration consists of several different processing steps. One of the steps involves contacting the catalyst with a reducing gas comprising hydrogen in order to accomplish a reduction reaction. The above-cited U.S. Pat. Nos., 3,647,680 (Greenwood et al.) and 3,692,496 (Greenwood et al.) may be consulted for background information on reforming and catalyst regeneration.

In many modern catalytic reforming processes, catalyst is moved continuously or semi-continuously through a regeneration vessel, or through a series of regeneration vessels, in which the various steps involved in a regeneration cycle are performed. Due to the well-known difficulties involved in transferring solids from location to location, mentioned above, true continuous processing is difficult to achieve. The catalytic regeneration process of the above-mentioned Greenwood patents uses a semi-continuous movement of catalysts at certain points and continuous movement at other points of the regeneration vessel, or vessels. By semi-continuous movement is meant the repeated transfer of a relatively small amount of catalyst at closely spaced points in time. For example, one batch of catalyst may be transferred out of a vessel each two minutes. If the inventory in that vessel is sufficiently large, the movement approximates continuous transfer of catalyst. This principle is used in the present invention. It is not necessary to provide further information on regeneration processes, as such is easily available n numerous sources, such as the above-mentioned Greenwood patents, and is not required for an understanding of the invention.

Following is a description of the embodiment of the invention depicted in FIG. 1, which presents the invention in the context of a reforming process. Catalyst particles enter an upper portion of a vessel 10, as shown by the arrow. The catalyst particles accumulate in an upper zone 12 found at the bottom of vessel 12. In vessel 10, the portion of a catalyst regeneration cycle known as reduction takes place. Gas, comprising hydrogen, at a high temperature, is contacted with the catalyst particles in upper zone 10 in order to accomplish reduction.

It is very important that an uninterrupted flow of gas through the reducing zone be maintained. Should the flow be interrupted for any interval of time, reduction of the catalyst will not be properly accomplished, with the result that its ability to catalyze reforming reactions is severely impaired. Also, if the flow of reducing gas is sufficiently high so that the catalyst is fluidized or partially fluidized, the catalyst will be subject to physical damage.

After catalyst is reduced in upper zone 10, it is ultimately transferred to a vessel 14 that provides a lower zone 16, which serves as a retention volume for catalyst flowing through the regeneration apparatus, and also serves an isolation function, while feeding catalyst to pneumatic conveying means for transporting the catalyst to a reforming reactor. Lower zone 14 is at a higher pressure than upper zone 12. For example, the upper zone could be maintained at a nominal pressure of 5 psig and permitted to vary within a range of 2 to 8 psig while the lower zone nominal pressure could be 35 psig, with a normal range of 30 to 40 psig. Thus, the differential pressure between the upper and lower zone might range between 22 and 38 psig. However, this invention may be used when the pressure differential between zones is much greater or much less. It may be in a range between 0.1 psig to 200 psig or more.

A vessel denoted lock hopper 18 and containing an intermediate zone 20 is used in effecting the transfer of catalyst from zone 12 to zone 14. Catalyst passes from zone 12 to lock hopper 8 through upper particle transfer conduit 22, which sealably extends through a nozzle on the top of lock hopper 18 to project into intermediate zone 20. Catalyst passes from lock hopper 18 to lower zone 16 via lower particle transfer conduit 24, which sealably extends into lower zone 16. As will be shown below, the extension of conduit 24 into lower zone 16 is not required; while a minimum length of conduit is required, it may be outside the vessels. The extension of conduit 22 into lock hopper 18 is not necessary when means for monitoring particle level at a high location in intermediate zone 20 is provided, but is required when no high level instrumentation is provided. Such high level instrumentation is not shown in FIG. 1, since it is not necessary to the embodiment depicted therein, but will be described below.

A common prior art procedure is to locate valves in conduit 22 and 24, between the three vessels, so that lock hoper 18 can be alternately filled with catalyst from upper zone 12 with the valve in conduit 24 closed, and then discharged to lower zone 16 while the valve in conduit 22 is in a closed position. However, as mentioned above, it is highly desirable to avoid the use of moving equipment, including valves, in the transfer paths of catalyst particles.

Reducing gas enters lower zone 16 through conduit 26. Valve 28 regulates the quantity of gas flowing into lower zone 16; this flow rate may be varied independently of the invention by means for controlling the pressure of lower zone 16 (not shown). For example, the pressure of lower zone 16 might be varied, within a previously established flow range, in response to signals from the abovementioned pneumatic conveying means.

Gas flows from lower zone 16 to upper zone 12 via one path, through lock hopper 18. This gas flow path comprises lower conduit 24, lock hopper 18, and upper conduit 22. Reducing gas that enters the lower zone 12 travels upward through and in contact with the catalyst. In the various modes of operation, it may be necessary to add additional reducing gas to vessel 10. This is done by adding gas to the outside of cylindrical baffle 30. Cylindrical baffle 30 is smaller in diameter than vessel 10 and disposed in a concentric manner inside it to form an annular space 31. The top of the annular space 31 is closed to gas flow by means of an annular horizontal plate. The open center area of the annular plate permits flow of catalyst and gas. Gas entering the annular space from a conduit 32 must therefore flow downward to the bottom of cylindrical baffle 30 and make a 180° turn to flow upward through the catalyst. FIG. 1 shows the diversion of reducing gas from conduit 26 into conduit 32.

The internal pressure of zone 12 is independently controlled by means not shown on the drawing. For example, upper zone 12 might be connected, by means of a conduit, to another vessel used in the catalytic reforming process, so that the upper zone pressure depends upon and varies with the pressure in that vessel.

Reducing gas also enters the lock hopper by a line 34. The flow of gas from line 34 is regulated by valve 36. Low level switch 8 is provided at lock hopper 18 to sense when catalyst level in the lock hopper zone is at a previously determined low level and transmit a signal to controller 40. In a manner hereinafter described, the controller 40 adjusts the position of valves 36 and 28 to maintain a minimum catalyst level in hopper 18.

The following description is presented with reference to both FIGS. 1 and 2. The above description relating to FIG. 1 also applies to FIG. 2. It can be seen that the same reference numbers used in FIG. 1 also appear on FIG. 2 where appropriate. Certain items have been omitted from FIG. 2 for drawing convenience, such as controller 40, but it is to be understood that these items are required for the operation of the embodiment of FIG. 2. In FIG. 2, which depicts a preferred arrangement, the three zones of FIG. 1 are located in a single vessel rather than separate vessels.

Figure 2C:
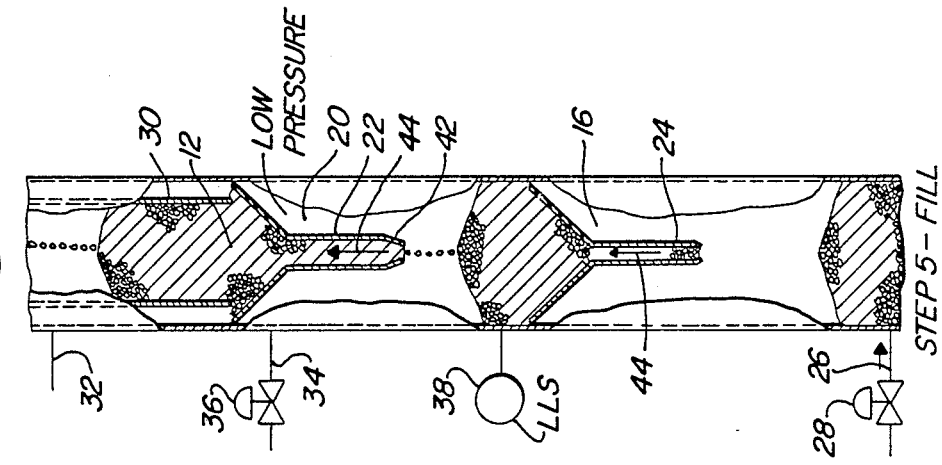
FIG. 2 is a schematic representation depicting the zones of FIG. 1 in a common vessel and depicting three steps in the operation of this invention by FIGS. 2A, 2B and 2C.

Transfer of catalyst particles from upper zone 12 to lower zone 16 may be broken down into five-steps cycle. The most significant three of the five steps are shown in FIG. 2. A single cycle results in the transfer of one batch of particles from the upper zone to the lower zone. FIG. 2A depicts step 1 of the cycle, where the apparatus is in a hold or ready mode. Intermediate zone 20 is filled to its maximum capacity with catalyst. There is an inventory of catalyst in upper zone 12, which catalyst remains in zone 12 for a time sufficient to attain proper reduction. Conduits 22 and 24 are filled with catalyst so that there is no discontinuity in a mass of catalyst occupying a lower portion of upper zone 12, upper transfer conduit 22, a lower portion of intermediate zone 20, and lower transfer conduit 24. The inventory in upper zone 12 is replenished with catalyst from that portion of the regeneration apparatus located above the upper zone (not shown). FIG. 2 also shows the top of an accumulation of catalyst in lower zone 16 at some distance below lower conduit 24.

Gas passes from lower zone 16 to intermediate zone 20 through lower transfer conduit 24 during step 1. The differential pressure between the lower and intermediate zones may be in a range between 0.1 and 100 psig or more, with the lower value usually above 5 psig. Downward flow of particles from intermediate zone 20 to lower zone 16 is prevented at this time by upward flow of gas through lower transfer conduit 24. With a high upward flow rate of gas, referred to as gas flux rate, and a relatively low depth of catalyst above upper transfer conduit 24, the particles in conduit 24 could be pushed upward into zone 20, causing a large increase in gas flow and partial fluidization of catalyst in zone 20. In order to avoid this, the design of the apparatus requires a minimum length for conduit 24 plus a minimum depth of the particle bed immediately above it. These lengths are dependent on the maximum gas flow rate expected/required through conduit 24. In establishing these minimum lengths and depths, it is necessary to consider the minimum required flow of gas and the pressure differential between zones. For a particular pressure differential, the longer the conduit, the lower the gas flow. Conduit diameter may be increased in order to increase gas flow at a given conduit length and pressure differential.

Flow of catalyst from upper zone 12 to intermediate zone 20 does not occur at this time (step 1) by virtue of the fact that the level of particles in intermediate zone 20 reaches the lower end 42 of upper transfer conduit 22. It can be seen that for catalyst to flow out of conduit 22 (FIG. 2A), catalyst at the end of the conduit and outside of the conduit must be displaced. A sufficient amount of force to accomplish displacement is not available in this situation and the level never rises above the end 42.

In step 2 (not shown) of the cycle, which may be denoted the pressurization step, valve 36 is opened. This results in a raising of the pressure in the intermediate zone. In this step the pressure in the intermediate zone is usually increased until it becomes greater than the internal pressure of the upper zone. As the intermediate zone is pressurized, valve 28 is closed. The closing of valve 28 and the increased pressure in intermediate zone reduces the gas flow through lower conduit 24 in preparation for step 3.

Figure 2B:
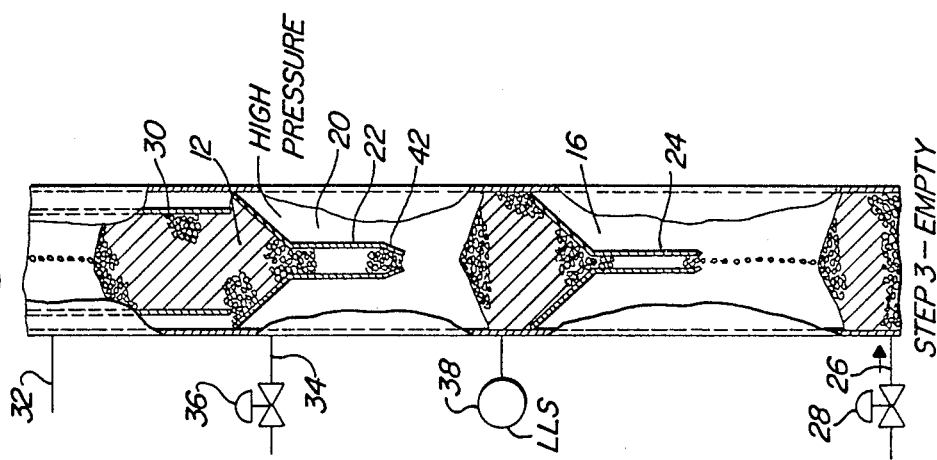
Figure 2A:
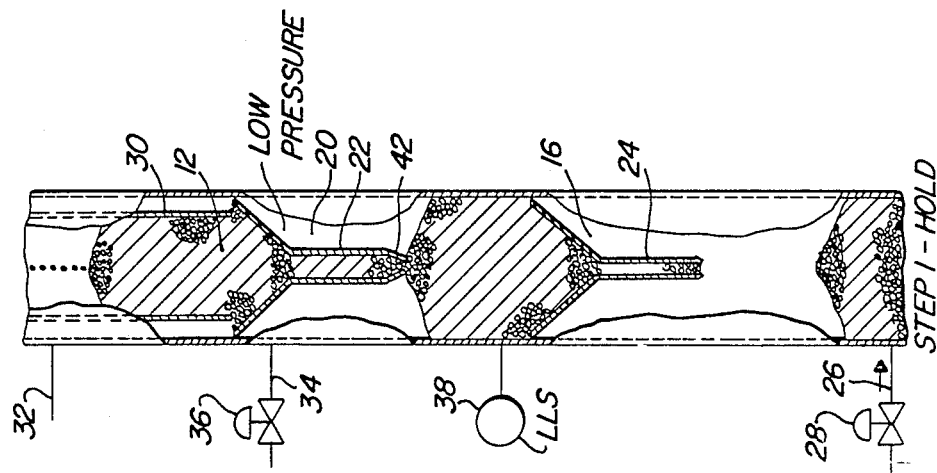

FIG. 2B depicts the latter portion of step 3 of the cycle, in which the catalyst level in intermediate zone 20 is near its normal low point. Step 3 is referred to as the "empty" portion of the cycle, where the intermediate zone is emptied of catalyst. Flow of solids from the upper zone into the intermediate zone is prevented by flow of gas upward through upper transfer conduit 22, in the same manner as discussed above in regard to conduit 24. The amount of gas entering through line 34 is increased as needed to prevent catalyst from flowing out of conduit 22. The level of particles in the intermediate zone falls as solids flow out of conduit 24 to lower zone 16. The pressures of the lower zone and the intermediate zone are substantially the same at this time (step 3), and the step may be completed with essentially no gas flow through conduit 24. If there is any small pressure difference between the lower and intermediate zone, it is equalized by gas flow through conduit 24. All of the exchange of gas for equalization of pressure between zones 16 and 20 occurs through conduit 24 so that none of the gas, that is likely to contain entrained catalyst particles passes through any valves. Throughout steps 1 through 3 there is no interruption of reducing gas flow into zone 12.

When the level in intermediate zone 20 falls to a previously determined low point, step 4, depressurization, is initiated. Low level switch 38 detects the absence of particles at said low point as soon as particle level falls to that location and immediately transmits a signal to controller 40. Controller 40 causes valve 36 to close and valve 28 to open, thus depressurizing intermediate zone 20 and changing the gas flow relationship to that of step 1. Step 4 ends when the pressure in the intermediate zone becomes substantially equal to the pressure of the upper zone.

In step 5, as shown by FIG. 2C, catalyst enters the intermediate zone via conduit 22. Step 5 differs from step 1 in that the intermediate zone 11 is full during step 1 and there is no flow of catalyst. During step 5, catalyst flows from upper zone 12 to intermediate zone 20 until the level rises to end 42 region of upper transfer pipe 22, thus completing the cycle and returning to a hold mode, represented by step 1.

Throughout step 5, there is a constant gas flow from lower zone 16 through intermediate zone 20 and into upper zone 12. The flow is indicated by arrows 44 in conduits 22 and 24. Conduit 24 is sized with a larger open flow area relative to conduit 24, so that the same gas flow will produce a high gas flux in the lower conduit, sufficient to prevent catalyst flow, while producing a low gas flux in the upper conduit that will allow catalyst flow. The flow area of the two conduits may be varied by altering the diameter of the two conduits or providing additional conduits between the upper and intermediate zones. In order to allow rapid gas transfer between the intermediate zones, it is preferred that the upper conduit have at least four times the open area as the lower conduit. Providing a large open area for the upper conduit relative to lower conduit will minimize the pressure drop of the upper conduit when conveying the gas stream from the lower zone. Typically, the upper conduit is sized, based on gas flow from the lower zone for a pressure drop of less than 10% of the pressure drop through the lower conduit.

This cycle of five steps is normally repeated continuously. For example, it may take approximately 50 seconds to transfer one batch of catalyst from upper zone 12 to lower zone 16. Controller 40 is capable of accepting a desired cycle repetition rate, which is usually manually entered, and sending a signal to initiate a cycle, that is, the movement of valves 28 and 36 so that step 2 is entered. A practical maximum cycle repetition rate for a 50-second cycle would be about once per 60 seconds. The catalyst transfer rate would then be, if the volume of the intermediate zone between normal maximum capacity (level at end 42 of conduit 22) and the low level switch were one cubic foot, one cubic foot per minute. A transfer rate of half of that maximum would require that controller 40 initiate a new cycle every two minutes.

Controller 40 functions as means for receiving a level signal from low level switch 38, means for controlling the positions of valves 28 and 36, and means for an operator to set a cycle repetition rate. There are many different types of apparatus capable of performing the functions of controller 40, such as process control computers and programmable controllers. Also, these functions can be accomplished by means of a cycle timer to provide signals to initiate a cycle and a flip-flop control device responsive to low level switch 38 for providing signals to enter step 4.

The length of conduits 22 and 24 are quite important to the operation of the system, as explained above. The magnitude of the permissible pressure differential between zones is dependent primarily on the length of the column of particles between zones, for a given diameter of transfer conduit and particle type. The length of the column of particles between zones is defined as the length of the transfer conduit plus the depth of the bed of particles above it in the zone, where the lowest point of the bed of particles is at the bottom of the conical section of the zone. If the pressure differential is too high, the catalyst will be blown out of the transfer pipe and up into the zone above it. If the pressure differential between zones is too low, the gas flow rate will be too low, resulting in low cycle times and possibly poor catalyst regeneration. The column of catalyst through which the gas flows upward may be viewed as a resistance to flow; flow rate through such a resistance, or restriction, varies with pressure drop across the restriction.

In a typical design situation, the pressure differential across the intermediate zone is known, since it is normally independently fixed by factors having no relationship to the lock hopper system. Thus, the starting point in design is the given pressures or pressure ranges in the upper zone and lower zone. The required maximum and minimum flow rates of gas upward through the zones and the required particle transfer rate are also known, being set by the process. The length of the catalyst column and the diameter of the particle transfer pipe are then considered. A balance between length and diameter is required to achieve the desired gas rate at the same time as the desired instantaneous flow rate of particles. Shortening the length with other factors constant or increasing the diameter with other factors constant will result in blowout if carried too far. Another feature of importance during design is the length of each of the components which make up the total column height of particles. Gas flow through the transfer pipe requires a significantly higher pressure drop per unit length than the same gas flow through the particle bed immediately above the transfer pipe. It should also be noted that gas flow rate through the particle bed must always be less than the rate which will cause fluidization of the particles. Those skilled in the art will now appreciate the interplay of variables and how to adjust each to obtain an appropriate design. Principles of solids flow are known to those skilled in the art and need not be discussed herein. For additional information on solids flow in the context of this invention, U.S. Pat. No. 2,851,401, mentioned above, may be consulted, though it does not deal with gas flow. It should be noted that common practice in design of solids flow systems is to conduct experiments to determine flow characteristics of the particular solid involved.

It can be seen that design of a system of this invention requires careful calculations. Given the internal pressures of the upper and lower zones, the minimum and maximum gas flow rates required by the process, the identities of the gas and the particles, and the required range of particle transfer rates, the system designer must carefully choose the size of the intermediate zone, in particular the normal minimum and maximum volumes occupied by the particles, the lock hopper zone bed depth above the transfer conduit, the diameter of the transfer conduits, and the lengths of the transfer conduits. Of course, there are other parameters to be chosen by the designer, such as gas conduit size, but these are the most important.

The apparatus of the invention may be used as a solids flow control device for an entire process, since the flow rate of particles from the upper zone to the lower zone can be varied, as discussed above.

It is necessary that the lower end of a particle transfer conduit have a smaller cross-sectional area for particle flow than the balance of the conduit; this is referred to as a restriction. For example, in the case of a circular conduit, the inside diameter of the end may be less than that of the balance of the conduit, such as is shown in FIG. 2A at reference number 42. The purpose of the restriction is to keep the particle transfer conduit full of particles when the pressures of the zones between which the transfer conduit communicates are about the same. When the pressures are not equal and gas is flowing upward, the particles will remain in the conduit. In a system such as is shown in FIG. 1, the most effective flow restriction exists at the point where the upper end of the conduit joins the cone bottom. A flow restriction which is more effective than this one is required. Without the restriction, particles passing through a conduit will be in dilute phase and when a pressure differential between zones is established, the conduit will be only partially full of particles, thus defeating the invention.

In another embodiment of this invention, a high level sensor may be used to limit the level of particles in the intermediate zone to a point below the end region of the upper particle transfer conduit. When the high level point is adjustable over a range, the size of each batch transferred may be adjusted. When the intermediate zone reaches a high level point, the high level sensor provides a signal to controller 40 which opens valve 36 and also leaving valve 26 in an open position. The gas path between the upper and lower zones then comprises both the upper and lower particle transfer conduits, which both have a high gas flux, so that particle flow in both conduits is prevented. Then when it is desired to start a cycle from this hold position, the lower zone valve 26 is closed to start the lock hopper empty step.

A reason for using a high level instrument instead of letting particle level rise to the lower end region of the upper particle transfer conduit is that, in this situation, gas flowing up the conduit tends to agitate the particles at the lower end region. This agitation may cause physical damage to the particles. Another method which has been proposed to solve this problem, should it occur, is to provide a perforated conduit portion at the lower end of the conduit. All or a portion of the gas would then flow through the perforations, thereby by-passing the catalyst and not causing agitation. The catalyst level would not rise beyond the lower end of the perforated portion of the conduit. Screening material could be used to form the perforated conduit.

EXAMPLE

This invention is further described in the context of the following example describing the design of a valveless transport system in accordance with this invention. This example is based, at least in part, on engineering calculations and operating experience with similar units. The system is designed to transfer 3600 lb/hr of 1/16" solid particulate catalyst spheres with a density of 30 lb/ft$^3$ from an upper zone operating at 35 psig to a lower zone operating at 80 psig. The gas medium in both zones is a hydrogen-rich catalytic reforming net gas stream.

The lower pipe diameter is sized first such that the solids flow rate by gravity flow is about 2 lb/sec; the resulting lower pipe inside diameter is about 2.5 inches. For a given desired pressure differential of 45 psi between the two zones, there is a broad range of combinations of upward gas flux and lower pipe length to achieve the pressure differential. However, since catalyst must flow down through the upper pipe, against the upflowing gas from the lower zone, the upper pipe diameter must be sufficiently large so that the upward gas flux will not create an upward pressure gradient nearly equal to the catalyst bulk density, inhibiting catalyst flow. Bulk density is based on the total volume occupied by the catalyst, including void spaces, and equals 33 lb/ft$^3$ for this catalyst. In practice, the upper pipe diameter is chosen such that the upward pressure gradient is less than 90% of the catalyst bulk density. Similarly, when the desired pressure differential of 45 psig is induced through the upper pipe, via a combination of upward gas flux and pipe length, the upper zone diameter should be chosen such that the upward pressure gradient is less than 25% of the catalyst bulk density. Therefore, it can be seen that choosing a certain lower pipe length and gas flux will set the diameters of the upper pipe and the upper zone.

In this example, both the lower and upper pipe lengths are chosen to be 6 feet to provide practical pipe and zone diameters and reasonable gas fluxes. The required gas flux through the lower pipe to create the 7.5 psi/ft upward pressure gradient is about 2360 lb/hr-ft$^2$ with a gas temperature of 340° F. (170° C.), molecular weight of 4.4, and average density of 0.037 lb/ft$^3$. The corresponding gas flux in the upper pipe is 107 lb/hr-ft$^2$ and produces an upward pressure gradient of 0.175 psi/ft. Due to the semi-continuous transfer of hot catalyst down through the vessels, the gas temperature is about 700° F. (370° C.), the molecular weight is unchanged and the gas density at 35 psig is 0.0176 lb/ft$^3$. The viscosity of the gas, which contributes a significant portion of the pressure drop at low gas flux, is about 0.0164 cP at 700° F. (370° C.). Since all of the gas from the lower pipe flows through the upper pipe, the ratio of the upper- to-lower pipe diameter is inversely proportional to the square root of their respective gas fluxes given above. Based on a lower pipe diameter of 2.5 inches and a ratio of 107/2360, the upper pipe diameter would be 11.75 inches. Even with the upward pressure gradient caused by the gas flux of 107 lb/hr-ft$^2$, the large diameter upper pipe transfers catalyst particles at nearly 29 lb/second. For a load size of 120 lbs., the catalyst transfer is accomplished in 4 and 60 seconds for the upper and lower pipes, respectively. The complete cycle time would be 120 seconds, leaving ample time for pressuring and depressuring the intermediate zone.

During the unload step, the gas flux required to hold up catalyst in the upper pipe is 1963 lb/hr-ft$^2$, at an average pressure of 57.5 psig and 700° F. (370° C.), or 2606 lb/hr of gas (224,550 SCFH). In order to maintain the upward pressure drop through the zone above the upper pipe to less than 25% of the fluidization pressure drop, the gas flux must be below 42 lb/hr-ft$^2$; a flowing diameter of 80 inches o should be provided in the upper zone to keep the gas flux below 42 lb/hr-ft$^2$.

What is claimed is:

1. A method for semi-continuously transferring solid particles through an upper collection zone, an intermediate collection zone and a lower collection zone, said method comprising:
    (a) passing particles from said upper zone to said intermediate zone through an upper transfer conduit, passing first gas stream into said lower zone, passing said first gas stream from said lower zone upwardly through a lower transfer conduit into said intermediate zone, and passing said first gas stream from said intermediate zone upwardly through said upper transfer conduit into said upper zone, said upper conduit having a flow larger than the flow area of said lower conduit and said gas stream having a flux rate that will prevent particle movement down said lower transfer conduit and permit particle movement down said upper transfer conduit;
    (b) passing a second gas stream into said intermediate zone to provide a gas flux rate up said upper transfer conduit that will prevent particle movement down said upper transfer conduit; and
    (c) reducing the flow of said first gas stream into said lower zone and passing particles from said intermediate zone to said lower zone through said lower transfer conduit.

2. The process of claim 1 wherein the upper zone and lower zones are maintained at different pressures.

3. The method of claim 2 wherein the flow area of said upper transfer conduit is at least four times greater than the area of said lower transfer conduit.

4. The method of claim 2 where in step (a) the gas flux produces a pressure drop through the upper conduit that is less than 10% of the pressure drop through the lower conduit.

5. The process of claim 4 wherein the upper and lower conduits have a flow restriction at their lower ends.

* * * * *